United States Patent
Tomishima et al.

(10) Patent No.: US 11,080,226 B2
(45) Date of Patent: *Aug. 3, 2021

(54) TECHNOLOGIES FOR PROVIDING A SCALABLE ARCHITECTURE FOR PERFORMING COMPUTE OPERATIONS IN MEMORY

(71) Applicant: Intel Corporation, Santa Clara, CA (US)

(72) Inventors: Shigeki Tomishima, Portland, OR (US); Srikanth Srinivasan, Portland, OR (US); Chetan Chauhan, Folsom, CA (US); Rajesh Sundaram, Folsom, CA (US); Jawad B. Khan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/737,779

(22) Filed: Jan. 8, 2020

(65) Prior Publication Data

US 2020/0311019 A1 Oct. 1, 2020

Related U.S. Application Data

(63) Continuation of application No. 16/368,983, filed on Mar. 29, 2019, now Pat. No. 10,534,747.

(51) Int. Cl.
*G06F 15/78* (2006.01)
*G06F 17/16* (2006.01)
(Continued)

(52) U.S. Cl.
CPC ...... *G06F 15/7867* (2013.01); *G06F 15/7842* (2013.01); *G06F 15/803* (2013.01); *G06F 17/16* (2013.01); *G06N 3/00* (2013.01)

(58) Field of Classification Search
None
See application file for complete search history.

(56) References Cited

U.S. PATENT DOCUMENTS

| 10,534,747 B2 * | 1/2020 | Tomishima | G06F 3/06 |
| 2007/0192571 A1 | 8/2007 | Feghali et al. | |

(Continued)

FOREIGN PATENT DOCUMENTS

WO 2017171769 A1 10/2017

OTHER PUBLICATIONS

Zois et al, "Massively parallel skyline computation for processing-in-memory architectures", eScholarship.org, https://escholarship.org/uc/item/9c57d0f4, Published Nov. 1, 2018, 13 pages.

(Continued)

*Primary Examiner* — Anh Q Tran
(74) *Attorney, Agent, or Firm* — Compass IP Law, PC

(57) ABSTRACT

Technologies for providing a scalable architecture to efficiently perform compute operations in memory include a memory having media access circuitry coupled to a memory media. The media access circuitry is to access data from the memory media to perform a requested operation, perform, with each of multiple compute logic units included in the media access circuitry, the requested operation concurrently on the accessed data, and write, to the memory media, resultant data produced from execution of the requested operation.

22 Claims, 8 Drawing Sheets

(51) Int. Cl.
  *G06N 3/00* (2006.01)
  *G06F 15/80* (2006.01)

(56) References Cited

U.S. PATENT DOCUMENTS

| | | |
|---|---|---|
| 2012/0208619 A1 | 8/2012 | Canterbury et al. |
| 2015/0199266 A1* | 7/2015 | Franchetti ............ G06F 15/7821 711/117 |
| 2016/0156855 A1 | 6/2016 | Boulanger et al. |
| 2018/0150372 A1* | 5/2018 | Nachimuthu ............. G06F 8/65 |
| 2019/0050717 A1* | 2/2019 | Temam ................. G06F 9/3895 |

OTHER PUBLICATIONS

Notice of Allowance for U.S. Appl. No. 16/368,983, dated Sep. 11, 2019, 8 pages.

Extended European Search Report for Patent Application No. 20158318.4, dated Sep. 4, 2020, 9 pages.

Liao Yan et al: "Novel In-Memory Matrix-Matrix Multiplication with Resistive Cross-Point Arrays", 2018 IEEE Symposium on VLSI Technology, IEEE, Jun. 18, 2018, 3 pages.

Zhu, et al, "Accelerating sparse matrix-matrix multiplication with 3D-stacked logic-in-memory hardware," 2013 IEEE High Performance Extreme Computing Conference (HPEC), Waltham, MA, 2013, 6 pages.

* cited by examiner

TECHNOLOGIES FOR PROVIDING A SCALABLE ARCHITECTURE FOR PERFORMING COMPUTE OPERATIONS IN MEMORY

RELATED APPLICATIONS

This application is a Continuation of, and claims the benefit of priority of, U.S. application Ser. No. 16/368,983 filed Mar. 29, 2019, issued Jan. 14, 2020 as U.S. Pat. No. 10,534,747; which is incorporated herein by reference in its entirety.

BACKGROUND

Artificial intelligence applications, such as applications that train neural networks and/or utilize neural networks to make inferences (e.g., identifying an object in an image, performing voice recognition, etc.) typically utilize relatively large amounts of compute capacity to perform tensor operations (e.g., matrix calculations, such as matrix multiplication) on matrix data. In some compute devices, the compute operations to support an artificial intelligence application may be offloaded from the general purpose processor to an accelerator device, such as a graphics processing unit (GPU). However, while a GPU may be capable of performing tensor operations faster than the processor, the efficiency (e.g., energy usage and speed) with which the compute device is able to perform the operations is still hampered by the fact that the data to be operated on (e.g., matrix data) resides in memory and is sent through a bus from the memory to the device performing the compute operations (e.g., the GPU), consuming time and energy. As the complexity and amount of data to be operated on increases (e.g., with increasingly complex artificial intelligence applications), the inefficiencies of existing systems, in terms of energy usage and speed, may increase correspondingly.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
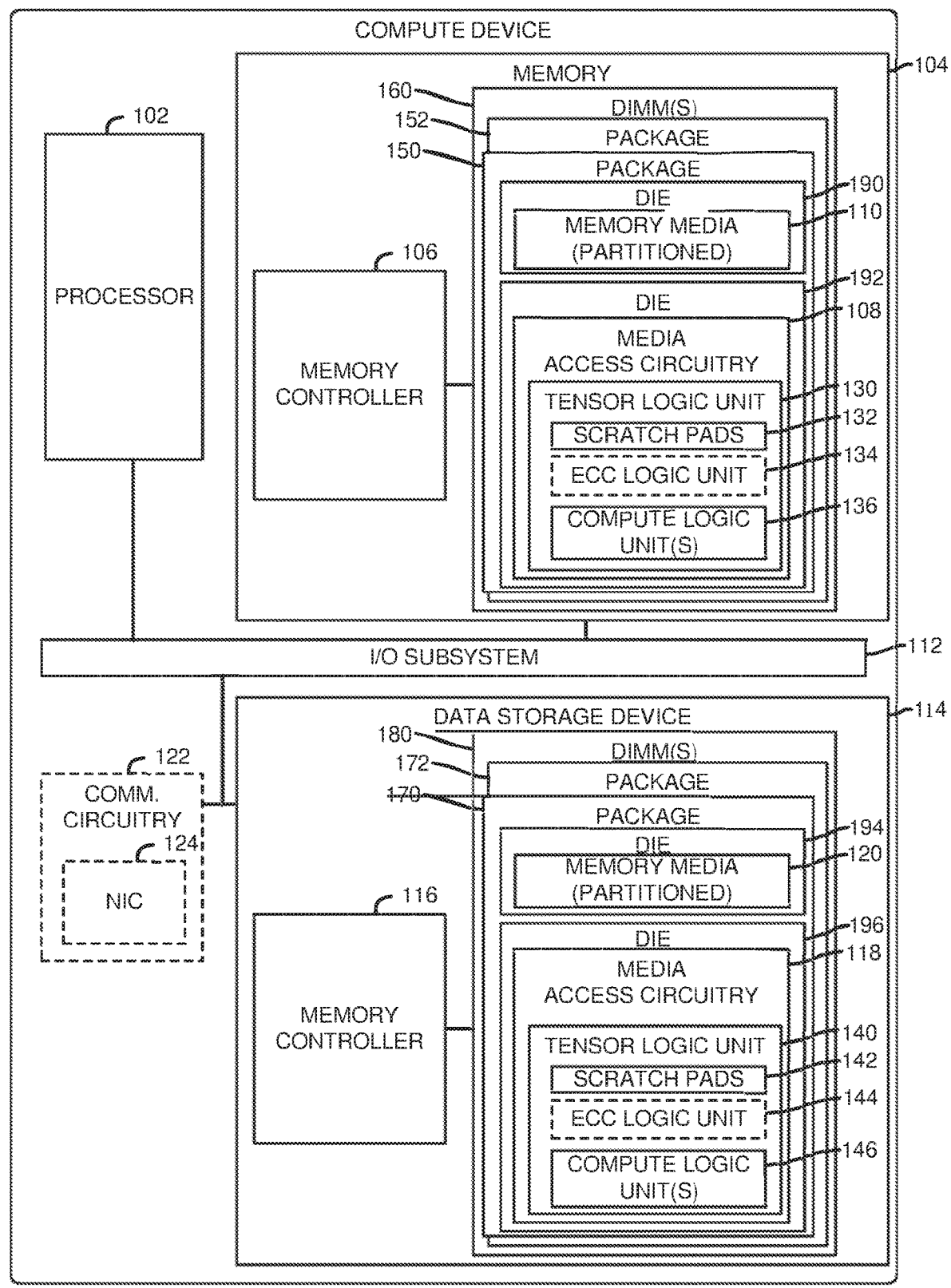
FIG. 1 is a simplified diagram of at least one embodiment of a compute device having a scalable architecture to efficiently perform compute operations in memory.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a compute device 100 for efficiently performing artificial intelligence operations (e.g., tensor operations) in memory includes a processor 102, memory 104, an input/output (I/O) subsystem 112, a data storage device 114, and communication circuitry 122. Of course, in other embodiments, the compute device 100 may include other or additional components, such as those commonly found in a computer (e.g., a display, peripheral devices, etc.). Additionally, in some embodiments, one or more of the illustrative components may be incorporated in, or otherwise form a portion of, another component. As described herein, the compute device 100, and in particular, the memory 104 of the compute device 100, has a scalable architecture in which one or more circuit boards (e.g., dual in-line memory modules (DIMMs) 160) adapted to be removably connected to (e.g., inserted into) the compute device 100 each includes a set of packages (e.g., each being a set of one or more semiconductor dies 190, 192) 150, 152 having compute logic units (e.g., compute logic units 136) configured to perform compute operations, such as tensor operations (e.g., matrix calculations), on data present in the memory 104. By performing compute operations closer to the data (e.g., in the memory 104) rather than sending the data through a bus to another component (e.g., the processor 102) to operate on the data, the compute device 100 may perform the operations more efficiently. Moreover, by adding additional DIMMs or similar circuit boards having compute logic units 136 to the memory 104, the ability of the compute device 100 to perform more complex compute operations on data in the memory 104 (e.g., more complex artificial intelligence operations) may be scaled up correspondingly.

As described in more detail herein, in the illustrative embodiment, the memory 104 includes media access circuitry 108 configured to access the memory media 110 to perform the compute operations. The memory media 110, in the illustrative embodiment, has a three-dimensional cross point architecture that has data access characteristics that differ from other memory architectures (e.g., dynamic random access memory (DRAM)), such as enabling access to one bit per tile and incurring time delays between reads or writes to the same partition or other partitions. In the illustrative embodiment, 128 bits may be read from a partition at a time.

The processor 102 may be embodied as any device or circuitry (e.g., a multi-core processor(s), a microcontroller, or other processor or processing/controlling circuit) capable of performing operations described herein, such as executing an application (e.g., an artificial intelligence related application that may utilize a neural network or other machine learning structure to learn and make inferences). In some embodiments, the processor 102 may be embodied as, include, or be coupled to an FPGA, an application specific integrated circuit (ASIC), reconfigurable hardware or hardware circuitry, or other specialized hardware to facilitate performance of the functions described herein.

Figure 2:
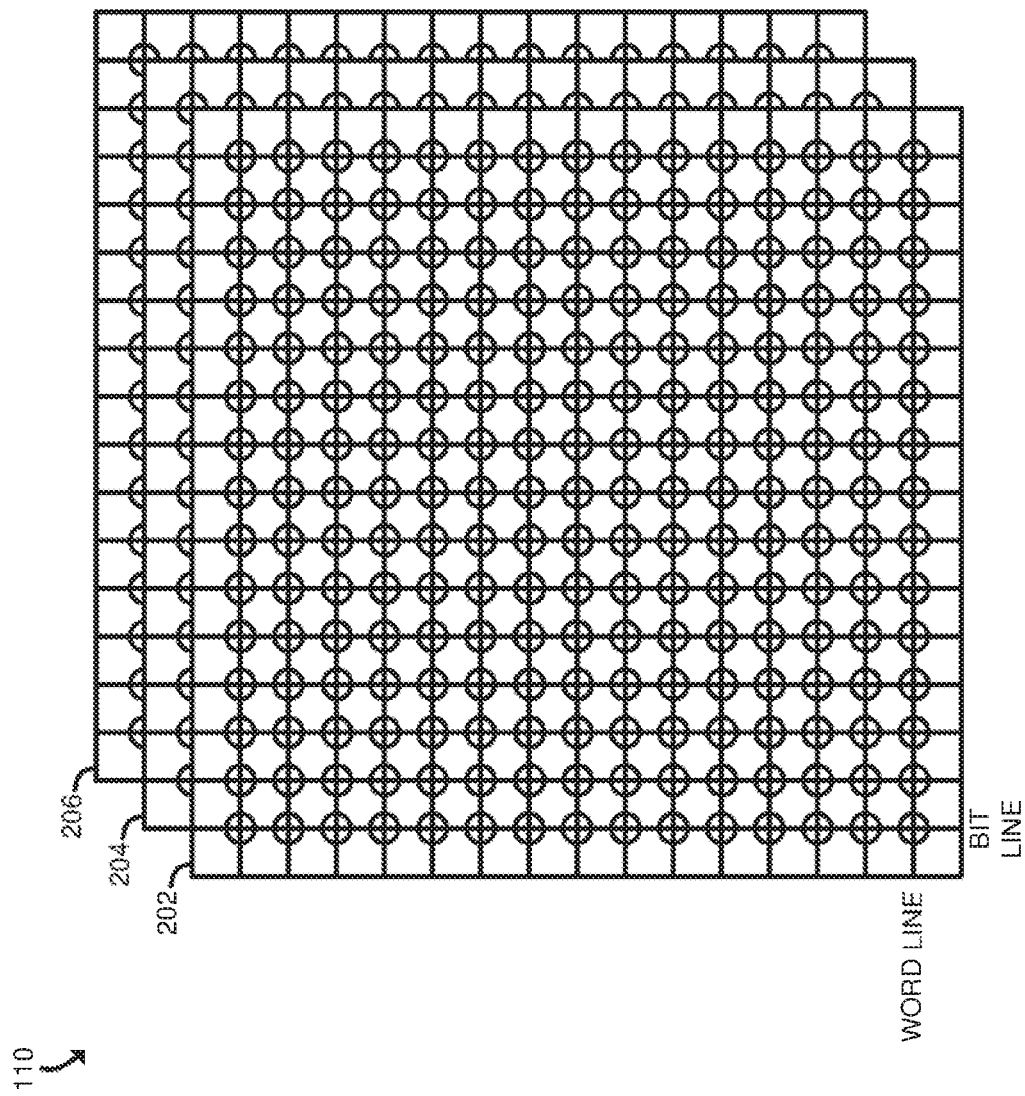
FIG. 2 is a simplified diagram of at least one embodiment of a memory media included in the compute device of FIG. 1.

The memory 104, which may include a non-volatile memory (e.g., a far memory in a two-level memory scheme), includes a memory media 110 and media access circuitry 108 (e.g., a device or circuitry, such as integrated circuitry constructed from complementary metal-oxide-semiconductors (CMOS) or other materials) underneath (e.g., at a lower location) and coupled to the memory media 110. The media access circuitry 108 is also connected to a memory controller 106, which may be embodied as any device or circuitry (e.g., a processor, a co-processor, dedicated circuitry, etc.) configured to selectively read from and/or write to the memory media 110 and to perform compute operations (e.g., tensor operations) on data (e.g., matrix data) present in the memory media 110 (e.g., in response to requests from the processor 102, which may be executing an artificial intelligence related application that relies on tensor operations to train a neural network and/or to make inferences). Referring briefly to FIG. 2, the memory media 110, in the illustrative embodiment, includes a tile architecture, also referred to herein as a cross point architecture (e.g., an architecture in which memory cells sit at the intersection of word lines and bit lines and are individually addressable and in which bit storage is based on a change in bulk resistance), in which each tile (e.g., memory cell) is addressable by an x parameter and a y parameter (e.g., a column and a row). The memory media 110 includes multiple partitions, each of which includes the tile architecture. The partitions may be stacked as layers 202, 204, 206 to form a three-dimensional cross point architecture (e.g., Intel 3D XPoint™ memory). Unlike typical memory devices, in which only fixed-size multiple-bit data structures (e.g., byte, words, etc.) are addressable, the media access circuitry 108 is configured to read individual bits, or other units of data, from the memory media 110 at the request of the memory controller 106, which may produce the request in response to receiving a corresponding request from the processor 102. In the illustrative embodiment, 128 bits may be accessed (e.g., read from or written to) in a given partition concurrently.

Referring back to FIG. 1, the media access circuitry 108, in the illustrative embodiment, includes a tensor logic unit 130, which may be embodied as any device or circuitry (e.g., CMOS circuitry) configured to offload the performance of compute operations, such as tensor operations, from other portions of the media access circuitry 108. The tensor logic unit 130, in the illustrative embodiment, includes multiple memory scratch pads 132, each of which may be embodied as any device or circuitry (e.g., static random access memories (SRAMs), register files, etc.) usable to provide relatively fast (e.g., low latency) access to data, such as matrix data, that has been read from the memory media 110. In the illustrative embodiment, the scratch pads 132 provide faster read and write access times than the memory media 110 which has comparatively slower access times and a larger capacity. The tensor logic unit 130 may additionally include an error correction code (ECC) logic unit 134, which may be embodied as any device or circuitry (e.g., reconfigurable circuitry, an application specific integrated circuit (ASIC), etc.) configured to determine whether data read from the memory media 110 contains errors and to correct any errors with error correction algorithm(s), such as Reed-Solomon codes or Bose-Chaudhuri-Hocquenghem (BCH) codes. Additionally, in the illustrative embodiment, the tensor logic unit 130 includes multiple compute logic units 136 each of which may be embodied as any device or circuitry (e.g., reconfigurable circuitry, ASICs, etc.) configured to perform compute operations (e.g., tensor operations) on data (e.g., matrix data) in a corresponding set of scratch pads 132.

Figure 3:
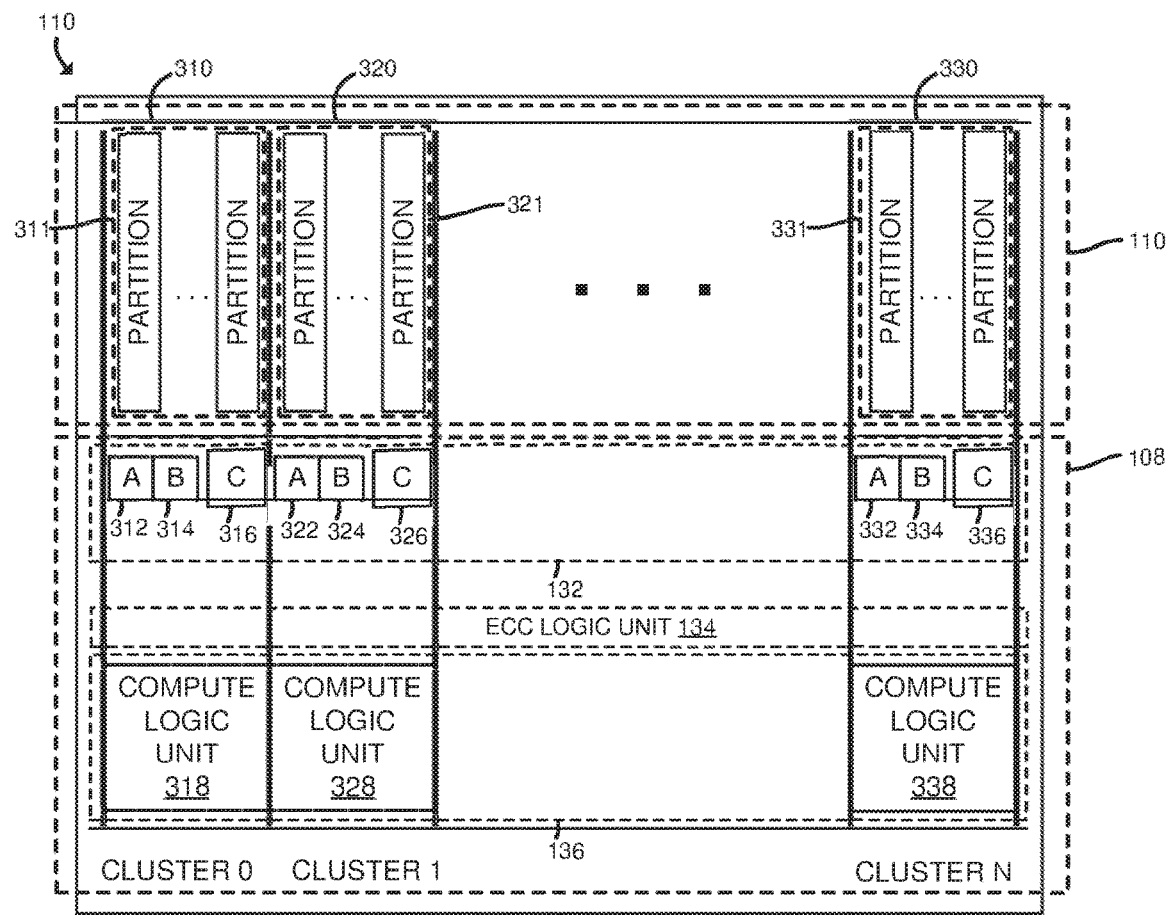
FIG. 3 is a simplified diagram of at least one embodiment of partitions of the memory media and components of a media access circuitry of a memory included in the compute device of FIG. 1.
Figure 9:
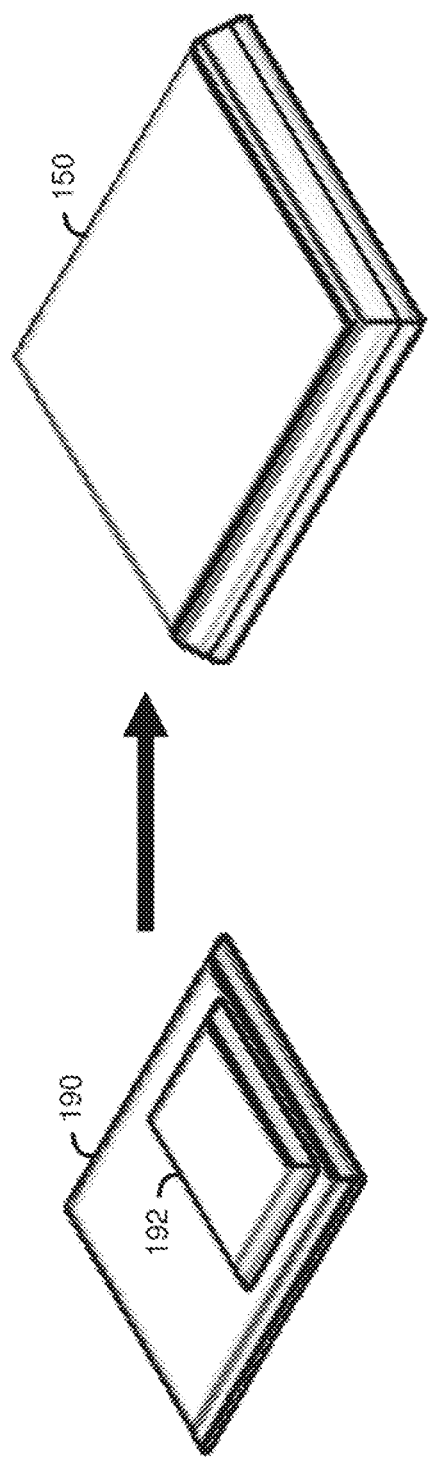
FIG. 9 is a simplified diagram of two dies from a memory of the compute device of FIG. 1 combined into a package.

Referring briefly to FIG. 3, in the illustrative embodiment, components of the memory 104 are divided into clusters 310, 320, 330. The cluster 310 includes multiple partitions 311 of the memory media 110, a set of scratch pads 312, 314, 316, each similar to the scratch pads 132 of FIG. 1, and a corresponding compute logic unit 318, similar to the compute logic unit 136 of FIG. 1. Similarly, the cluster 320 includes another set of partitions 321 of the memory media 110, a corresponding set of scratch pads 322, 324, 326, and a corresponding compute logic unit 328. The cluster 330 also includes a set of partitions 331 of the memory media 110, a corresponding set of scratch pads 332, 334, 336, and a compute logic unit 338. In some embodiments, a compute logic unit 136 (e.g., the compute logic unit 318) may broadcast (e.g., provide) a set of data from a partition associated with that compute logic unit 318 (e.g., one of the partitions 311) to one or more other compute logic units 136 (e.g., to scratch pad(s) 132 associated with those other compute logic units 136). By broadcasting, to the other scratch pads, data that has been read from a corresponding set of partitions of the memory media 110, the media access circuitry 108 reduces the number of times that a given section (e.g., set of partitions) of the memory media 110 must be accessed to obtain the matrix data (e.g., read matrix data may be broadcast to multiple scratch pads after being read from the memory media 110 once, rather than reading the same matrix data from the memory media 110 multiple times). Further, by utilizing multiple compute logic units 318, 328, 338 that are each associated with corresponding scratch pads 312, 314, 316, 322, 324, 326, 332, 334, 336, the media access circuitry 108 may perform the portions of a tensor operation (e.g., matrix multiply and accumulate) concurrently (e.g., in parallel). It should be understood that while three clusters 310, 320, 330 are shown in FIG. 3 for simplicity, the actual number of clusters and corresponding partitions, scratch pads, and compute logic units may differ depending on the particular embodiment. Referring briefly to FIG. 9, the memory media 110 may be included on the die 190 and the media access circuitry 108 may be included on another die 192. Each die 190, 192 may be embodied as a pattern on a semiconductor wafer that defines circuitry to perform a set of functions. As shown in FIG. 9, both dies 190, 192 may be combined together into the package 150. The package 150 may include a casing (e.g., a metal casing, a plastic casing, a glass casing, a ceramic casing, etc.) to house the dies 190, 192. In other embodiments, the memory media 110 and the media access circuitry 108 are located on the same die.

Figure 4:
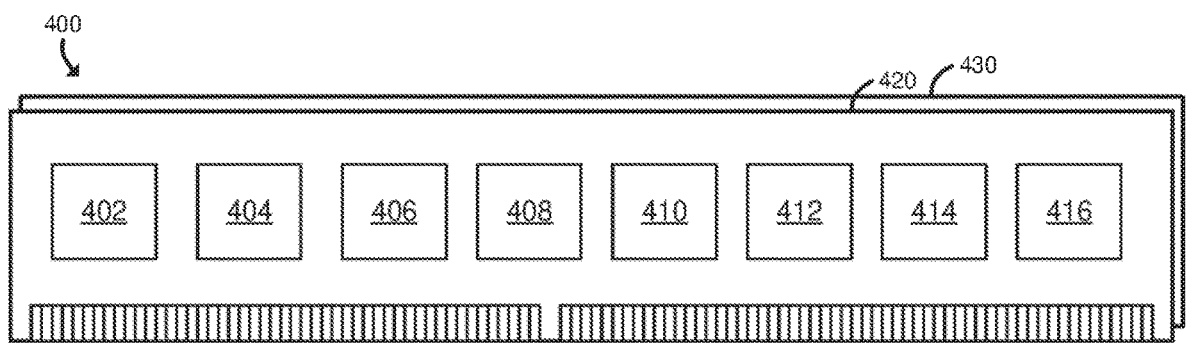
FIG. 4 is a simplified diagram of at least one embodiment of a set of dual in-line memory modules that may be included in the compute device of FIG. 1.

Referring briefly to FIG. 4, a set 400 of dual in-line memory modules (DIMMs) 420, 430 are shown. The DIMM 420 includes multiple packages 402, 404, 406, 408, 410, 412, 414, and 416, each being similar to the package 150 of FIGS. 1 and 9. Further, in the illustrative embodiment, each package includes 64 partitions, with one compute logic unit 136 assigned to each set of four partitions. As such, in a DIMM (e.g., the DIMM 420) with eight packages, the DIMM has 128 compute logic units 136. By adding another DIMM (e.g., the DIMM 430) to the memory 104, the in-memory compute capacity is doubled, with another 128 compute logic units 136. As such, by successively adding DIMMs to the memory 104, the in-memory compute capacity may be scaled up, significantly increasing the ability of the compute device 100 to efficiently perform artificial intelligence operations (e.g., tensor operations). In some embodiments, a DIMM (e.g., the DIMM 420) may include one die having the media access circuitry 108 and multiple other dies of the memory media 110, such that the entire DIMM 420 has a set of components (e.g., dies) similar to that of a package (e.g., the package 150). In other embodiments, the one or more packages (e.g., the packages 402, 404, 406, 408, 410, 412, 414, 416) may be located on another type of circuit board other than a DIMM. For example, the packages may be included on a relatively small circuit board that is insertable into a universal serial bus (USB) interface of the compute device 100.

Figure 5:
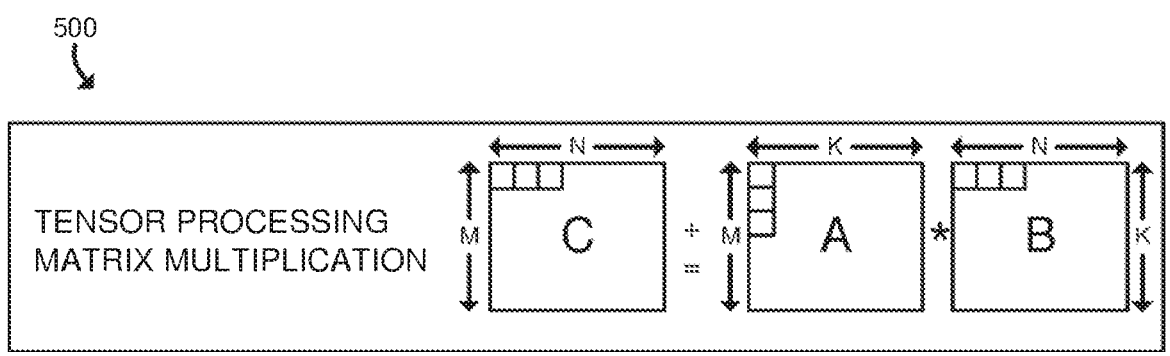
FIG. 5 is a simplified diagram of at least one embodiment of a tensor operation that may be performed in the memory of the compute device of FIG. 1.

Referring briefly to FIG. 5, an example of a matrix multiplication (e.g., matrix multiply and accumulate) operation 500 that may be performed by the memory 104 is shown. As illustrated, matrix data in an input matrix A is multiplied by matrix data in another matrix B (e.g., weight data for a layer of a convolutional neural network) and the resultant data is written to the output matrix C. Each matrix represented in FIG. 5 is temporarily stored as matrix data in the scratch pads 132 of the media access circuitry 108. In some embodiments, the output matrix C may be utilized as an input matrix for a subsequent tensor operation (e.g., as an input matrix for a subsequent layer of a convolutional neural network).

Referring back to FIG. 1, the memory 104 may include non-volatile memory and volatile memory. The non-volatile memory may be embodied as any type of data storage capable of storing data in a persistent manner (even if power is interrupted to the non-volatile memory). For example, the non-volatile memory may be embodied as one or more non-volatile memory devices. The non-volatile memory devices may include one or more memory devices configured in a cross point architecture that enables bit-level addressability (e.g., the ability to read from and/or write to individual bits of data, rather than bytes or other larger units of data), and are illustratively embodied as three-dimensional (3D) cross point memory. In some embodiments, the non-volatile memory may additionally include other types of memory, including any combination of memory devices that use chalcogenide phase change material (e.g., chalcogenide glass), ferroelectric transistor random-access memory (Fe-TRAM), nanowire-based non-volatile memory, phase change memory (PCM), memory that incorporates memristor technology, Magnetoresistive random-access memory (MRAM) or Spin Transfer Torque (STT)-MRAM. The volatile memory may be embodied as any type of data storage capable of storing data while power is supplied volatile memory. For example, the volatile memory may be embodied as one or more volatile memory devices, and is periodically referred to hereinafter as volatile memory with the understanding that the volatile memory may be embodied as other types of non-persistent data storage in other embodiments. The volatile memory may have an architecture that enables bit-level addressability, similar to the architecture described above.

The processor 102 and the memory 104 are communicatively coupled to other components of the compute device 100 via the I/O subsystem 112, which may be embodied as circuitry and/or components to facilitate input/output operations with the processor 102 and/or the main memory 104 and other components of the compute device 100. For example, the I/O subsystem 112 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 112 may form a portion of a system-on-a-chip (SoC) and be incorporated, along with one or more of the processor 102, the main memory 104, and other components of the compute device 100, in a single chip.

The data storage device 114 may be embodied as any type of device configured for short-term or long-term storage of data such as, for example, memory devices and circuits, memory cards, hard disk drives, solid-state drives, or other data storage device. In the illustrative embodiment, the data storage device 114 includes a memory controller 116, similar to the memory controller 106, storage media 120, similar to the memory media 110, and media access circuitry 118, similar to the media access circuitry 108, including a tensor logic unit 140, similar to the tensor logic unit 130, scratch pads 142, similar to the scratch pads 132, an ECC logic unit 144, similar to the ECC logic unit 134, and compute logic units 146, similar to the compute logic units 136. Further, similar to the memory 104, the storage media 120 and the media access circuitry 118 may be present in multiple packages 170, 172 (e.g., each having a set of one or more dies 194, 196) and multiple DIMMs 180. As such, in the illustrative embodiment, the data storage device 114 (e.g., the media access circuitry 118) is capable of efficiently performing compute operations (e.g., tensor operations) on data (e.g., matrix data) stored in the storage media 120 and the compute capacity may be easily scaled up by adding additional DIMMs 180. The data storage device 114 may include a system partition that stores data and firmware code for the data storage device 114 and one or more operating system partitions that store data files and executables for operating systems.

The communication circuitry 122 may be embodied as any communication circuit, device, or collection thereof, capable of enabling communications over a network between the compute device 100 and another device. The communication circuitry 122 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 122 includes a network interface controller (NIC) 122, which may also be referred to as a host fabric interface (HFI). The NIC 124 may be embodied as one or more add-in-boards, daughter cards, network interface cards, controller chips, chipsets, or other devices that may be used by the compute device 100 to connect with another compute device. In some embodiments, the NIC 124 may be embodied as part of a system-on-a-chip (SoC) that includes one or more processors, or included on a multichip package that also contains one or more processors. In some embodiments, the NIC 124 may include a local processor (not shown) and/or a local memory (not shown) that are both local to the NIC 124. In such embodiments, the local processor of the NIC 124 may be capable of performing one or more of the functions of the processor 102. Additionally or alternatively, in such embodiments, the local memory of the NIC 124 may be integrated into one or more components of the compute device 100 at the board level, socket level, chip level, and/or other levels.

Figure 6:
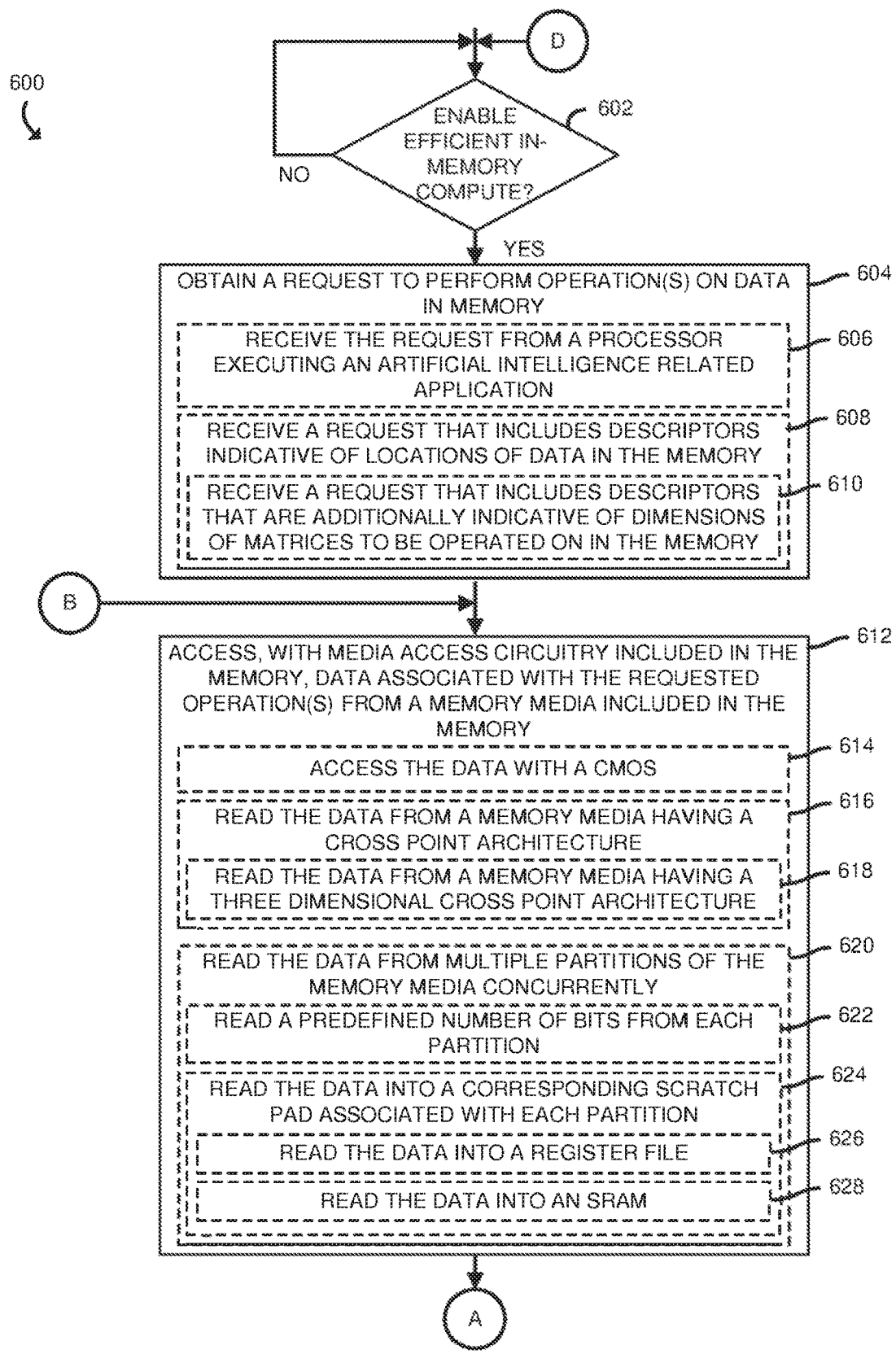
FIGS. 6-8 are simplified diagrams of at least one embodiment of a method for performing efficient compute operations in memory that may be performed by the compute device of FIG. 1.

Referring now to FIG. 6, the compute device 100, in operation, may execute a method 600 for performing efficient in-memory (e.g., in the memory 104) compute operations. The method 600 is described with reference to the memory 104. However, it should be understood that the method 600 could be additionally or alternatively performed using the memory of the data storage device 114. The method 600 begins with block 602 in which the compute device 100 (e.g., the memory 104) determines whether to enable the performance of efficient compute operations (e.g., tensor operations) in the memory 104. The compute device 100 may enable the performance of efficient compute operations in the memory 104 in response to a determination that the media access circuitry 108 includes the tensor logic unit 130, in response to a determination that a configuration setting (e.g., in a configuration file) indicates to enable the performance of efficient compute operations in memory, and/or based on other factors.

Regardless, in response to a determination to enable the performance of efficient in-memory compute operations, the method 600 advances to block 604, in which the compute device 100 may obtain a request to perform one or more operations on data in the memory 104. For example, and as indicated in block 606, the memory 104 (e.g., the media access circuitry 108) may receive the request from a processor (e.g., the processor 102), which may be executing an artificial intelligence related application (e.g., an application that may utilize a neural network or other machine learning structure to learn and make inferences). As indicated in block 608, the memory 104 (e.g., the media access circuitry 108) may receive a request that includes descriptors (e.g., parameters or other data) indicative of locations (e.g., addresses) of data to be operated on in the memory 104. As indicated in block 610, the memory 104 may receive a request that includes descriptors that are indicative of dimensions of matrices to be operated on in the memory 104.

Subsequently, the method 600 advances to block 612, in which the compute device 100 accesses, with media access circuitry (e.g., the media access circuitry 108) included in the memory 104, data associated with the requested operation(s) (e.g., the data to be operated on) from a memory media (e.g., the memory media 110) included in the memory 104. In the illustrative embodiment, the compute device 100 accesses the data (e.g., from the memory media 110) with a complementary metal oxide semiconductor (CMOS) (e.g., the media access circuitry 108 may be formed from a CMOS), as indicated in block 614. Additionally, and as indicated in block 616, in the illustrative embodiment, the memory 104 (e.g., the media access circuitry 108) reads the data from a memory media (e.g., the memory media 110) having a cross point architecture (e.g., an architecture in which memory cells sit at the intersection of word lines and bit lines and are individually addressable and in which bit storage is based on a change in bulk resistance). Further, and as indicated in block 618, the media access circuitry 108 may read the matrix data from a memory media (e.g., the memory media 110) having a three dimensional cross point architecture (e.g., an architecture in which sets of tiles are stacked as layers, as described with reference to FIG. 2). In other embodiments, the compute device 100 may read the data from a memory media having a different architecture.

As indicated in block 620, the compute device 100 (e.g., the media access circuitry 108) may read the data from multiple partitions of the memory media 110 (e.g., concurrently). In doing so, the compute device 100 may read a predefined number of bits (e.g., 128 bits) from each partition, as indicated in block 622. As indicated in block 624, the compute device 100 (e.g., the media access circuitry 108) may read the data into scratch pads associated with the corresponding partitions. For example, the media access circuitry 108 may read data from one of the partitions 311 into the scratch pad 312, data from one of the partitions 321 into the scratch pad 322, and so on. In reading data into a scratch pad, the compute device 100 (e.g., the media access circuitry 108) may read the data into a register file (e.g., an array of registers) or a static random access memory (SRAM), as indicated in blocks 626 and 628, respectively. Subsequently, the method 600 advances to block 630 of FIG. 7, in which the compute device 100 performs, with the media access circuitry 108, at least a portion of the requested operation(s) on the data accessed from the memory media 110.

Figure 7:
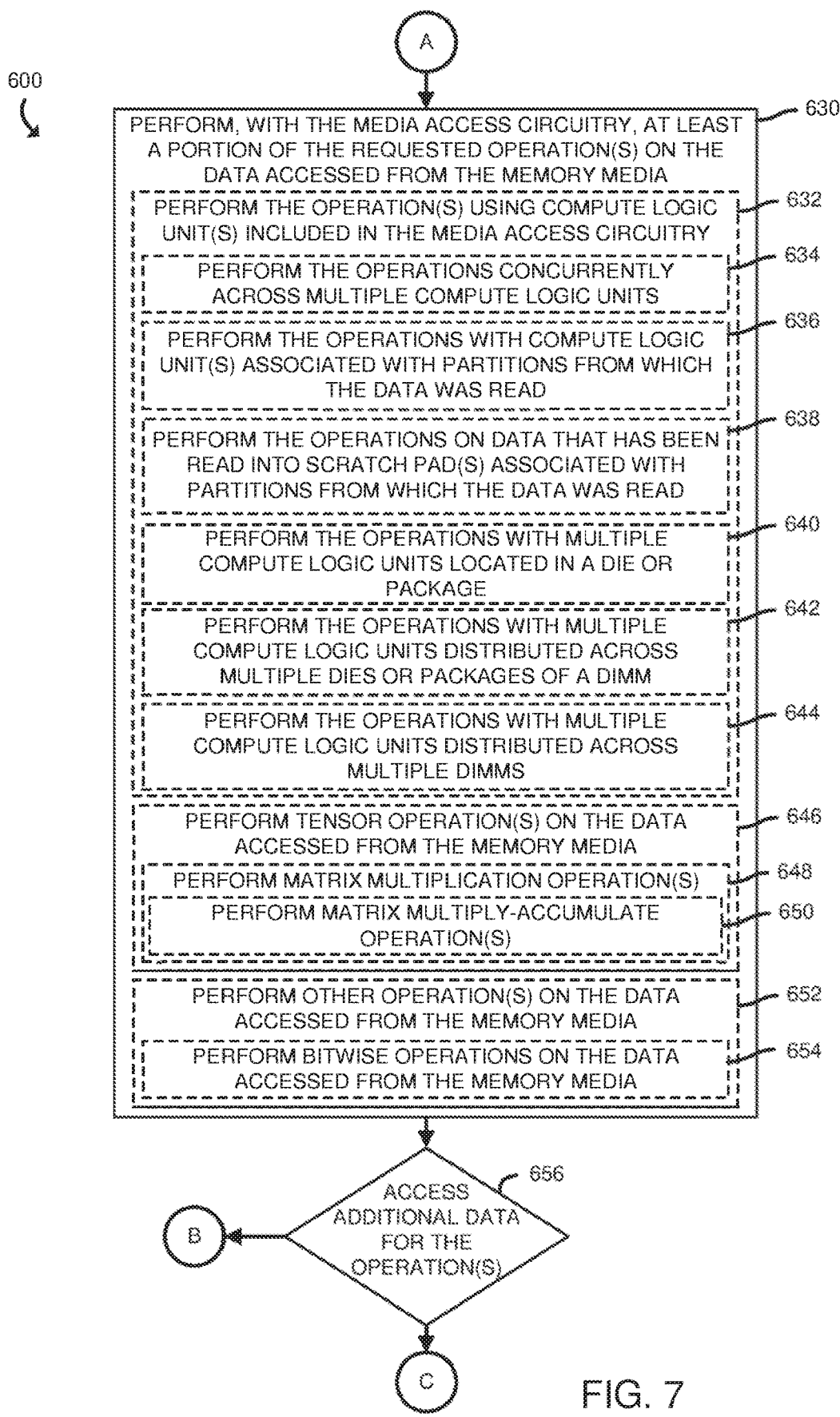

Referring now to FIG. 7, in performing at least a portion of the requested operation(s), the compute device 100 (e.g., the media access circuitry 108) performs the operation(s) using compute logic units 136 in the media access circuitry 108, as indicated in block 632. As indicated in block 634, the compute device 100, in the illustrative embodiment, performs the operations (e.g., sub-operations of the requested operation, such as operating on portions of one or more matrices) concurrently across multiple compute logic units 136. As indicated in block 636, the compute device 100 may perform the operations (e.g., sub-operations of the requested operation) with compute logic units associated with partitions from which the data was read. In the illustrative embodiment, and as indicated in block 638, the compute device 100 performs the operations on data that has been read into scratch pad(s) associated with the partitions from which the data was read (e.g., the scratch pads 312, 314, 316 associated with the partition 311, the scratch pads 322, 324, 326 associated with the partition 321, etc.). As indicated in block 640, the compute device 100 may perform the operations with multiple compute logic units (e.g., the compute logic units 318, 328, 338) located in a die or package (e.g., the package 402). Further, and as indicated in block 642, the compute device 100 may perform the operations with multiple compute logic units distributed across multiple dies or packages (e.g., the packages 402, 404, 406, 408, 410, 412, 414, 416) of a DIMM (e.g., the DIMM 420). Further, and as indicated in block 644, the compute device 100 may perform the operations with multiple compute logic units distributed across multiple DIMMs (e.g., the DIMMs 420, 430).

In performing the operation(s), the compute device 100 (e.g., the media access circuitry 108) may perform one or more tensor operations on the data accessed from the memory media 110, as indicated in block 646. In doing so, the compute device 100 (e.g., the media access circuitry 108) may perform one or more matrix multiplication operations (e.g., multiplying an input matrix A by a weight matrix B to produce an output matrix C), as indicated in block 648. As indicated in block 650, in performing one or more matrix multiplication operations, the compute device 100 (e.g., the media access circuitry 108) may perform one or more matrix multiply-accumulate operations. In other embodiments, the compute device 100 (e.g., the media access circuitry 108) may perform other types of operations (e.g., other than tensor operations) on the data, as indicated in block 652. For example, and as indicated in block 654, the compute device 100 (e.g., the media access circuitry 108) may perform one or more bitwise operations (e.g., logic operations on individual bits, such as AND, OR, XOR, NOR) on the data accessed from the memory media 110.

Subsequently, the method 600 advances to block 656, in which the compute device 100 determines whether to access additional data to continue performance of the requested operation(s). For example, if a tensor operation was requested and only a portion of (e.g., less than all of the rows and/or columns) the matrix data associated with the tensor operation has been operated on, the compute device 100 may determine that additional data (e.g., additional matrix data) is to be accessed to complete the requested operation. If the compute device 100 determines to access additional data, the method 600 loops back to block 612 of FIG. 6 to access the additional data. Otherwise, the method 600 advances to block 658 of FIG. 8, in which the compute device 100 (e.g., the media access circuitry 108) may write resultant data produced from execution of the requested operation(s) to the memory (e.g., to the memory media 110).

Figure 8:
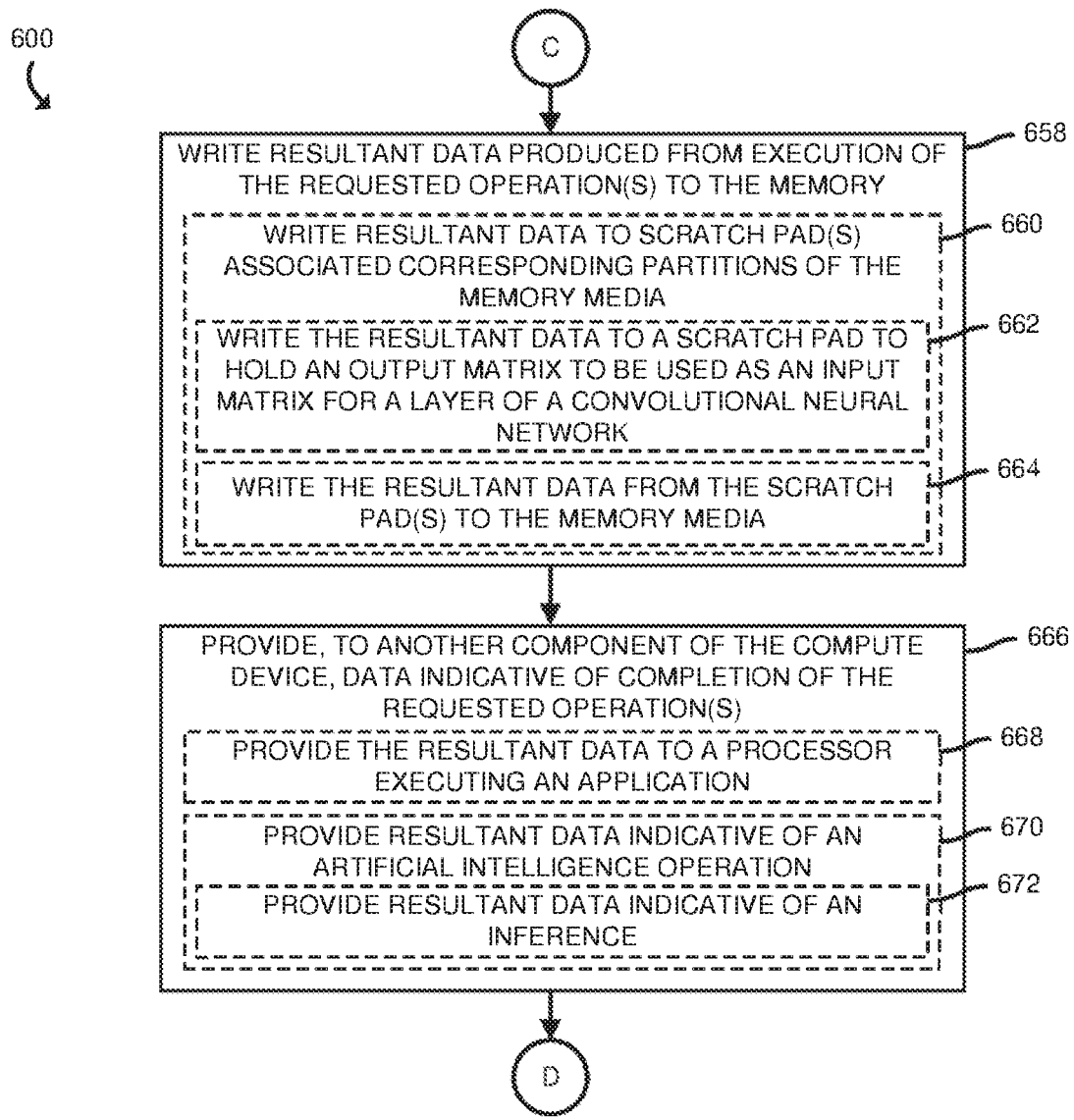

Referring now to FIG. 8, in writing the resultant data, and as indicated in block 660, the media access circuitry 108 may initially write the resultant data to one or more scratch pads, each associated with a set of partitions of the memory media 110 (e.g., adding, to the scratch pad 316, the result of a multiplication of input matrix A from the scratch pad 312 with a weight matrix B from the scratch pad 314, adding, to the scratch pad 326, the result of a multiplication of input matrix A from the scratch pad 322 with the weight matrix B from the scratch pad 324, etc.). As indicated in block 662, the media access circuitry 108 may write the resultant data to a scratch pad (e.g., the scratch pads 316, 326, 336) to each hold an output matrix (e.g., matrix C) that is to be used as an input matrix for a layer (e.g., a subsequent layer) of a convolutional neural network. As indicated in block 664, the media access circuitry 108 may write the resultant data from the scratch pad(s) 316, 326, 336 to the memory media 110 (e.g., to the corresponding partitions). Subsequently, in block 666, the memory 104 may provide, to another component of the compute device 100, data indicative of completion of the requested operation(s). In doing so, and as indicated in block 668, the memory 104 may provide the resultant data (e.g., from block 658) to a processor (e.g., the processor 102) executing an application (e.g., an application that produced the request for the operation(s) to be performed in the memory 104). As indicated in block 670, the memory 104 may provide, to the other component of the compute device 100 (e.g., the processor 102) resultant data indicative of an artificial intelligence operation. For example, and as indicated in block 672, the memory 104 may provide data indicative of an inference (e.g., an identification of an object in an image, etc.). Subsequently, the method 600 loops back to block 602 of FIG. 6, in which the compute device 100 determines whether to continue to enable efficient in-memory compute operations.

EXAMPLES

Illustrative examples of the technologies disclosed herein are provided below. An embodiment of the technologies may include any one or more, and any combination of, the examples described below.

Example 1 includes a memory comprising media access circuitry coupled to a memory media, wherein the media access circuitry is to access data from the memory media to perform a requested operation; perform, with each of multiple compute logic units included in the media access circuitry, the requested operation concurrently on the accessed data; and write, to the memory media, resultant data produced from execution of the requested operation.

Example 2 includes the subject matter of Example 1, and wherein to perform, with each of multiple compute logic units, the requested operation comprises to perform the requested operation with multiple compute logic units associated with different partitions of the memory media.

Example 3 includes the subject matter of any of Examples 1 and 2, and wherein to perform, with each of multiple compute logic units, the requested operation comprises to perform, with each of multiple compute logic units located in a die or package, the requested operation.

Example 4 includes the subject matter of any of Examples 1-3, and wherein to perform, with each of multiple compute logic units, the requested operation comprises to perform, with each of multiple compute logic units located in multiple dies or packages of a dual in-line memory module, the requested operation.

Example 5 includes the subject matter of any of Examples 1-4, and wherein to perform, with each of multiple compute logic units, the requested operation comprises to perform, with each of multiple compute logic units distributed across multiple dual in-line memory modules, the requested operation.

Example 6 includes the subject matter of any of Examples 1-5, and wherein to access data from the memory media comprises to read the data from multiple partitions of the memory media.

Example 7 includes the subject matter of any of Examples 1-6, and wherein to access data from the memory media comprises to read the data into scratch pads associated with each of the multiple partitions.

Example 8 includes the subject matter of any of Examples 1-7, and wherein to read the data into scratch pads comprises to read the data into register files or static random access memories of the media access circuitry.

Example 9 includes the subject matter of any of Examples 1-8, and wherein to access data from the memory media comprises to access data from a memory media having a three dimensional cross point architecture.

Example 10 includes the subject matter of any of Examples 1-9, and wherein to perform the requested operation comprises to perform a tensor operation.

Example 11 includes the subject matter of any of Examples 1-10, and wherein to perform the requested operation comprises to perform a matrix multiplication operation.

Example 12 includes the subject matter of any of Examples 1-11, and wherein to perform the requested operation comprises to perform a bitwise operation on the accessed data.

Example 13 includes the subject matter of any of Examples 1-12, and wherein the media access circuitry is further to provide, to a component of the compute device, data indicative of completion of the requested operation.

Example 14 includes a method comprising accessing, by a media access circuitry included in a memory, data from a memory media coupled to the media access circuitry, to perform a requested operation; performing, by each of multiple compute logic units in the media access circuitry, the requested operation concurrently on the accessed data; and writing, by the media access circuitry and to the memory media, resultant data produced from the execution of the requested operation.

Example 15 includes the subject matter of Example 14, and wherein performing, by each of multiple compute logic units, the requested operation comprises performing, by multiple compute logic units associated with different partitions of the memory media, the requested operation.

Example 16 includes the subject matter of any of Examples 14 and 15, and wherein performing, by each of multiple compute logic units, the requested operation comprises performing, by each of multiple compute logic units located in a die or package, the requested operation.

Example 17 includes the subject matter of any of Examples 14-16, and wherein performing, by each of multiple compute logic units, the requested operation comprises performing, by each of multiple compute logic units located in multiple dies or packages of a dual in-line memory module, the requested operation.

Example 18 includes the subject matter of any of Examples 14-17, and wherein performing, by each of multiple compute logic units, the requested operation comprises performing, by each of multiple compute logic units distributed across multiple dual in-line memory modules, the requested operation.

Example 19 includes the subject matter of any of Examples 14-18, and wherein accessing data from the memory media comprises reading the data from multiple partitions of the memory media.

Example 20 includes one or more machine-readable storage media comprising a plurality of instructions stored thereon that, in response to being executed, cause media access circuitry included in a memory to access data from the memory media to perform a requested operation; perform, with each of multiple compute logic units included in the media access circuitry, the requested operation concurrently on the accessed data; and write, to the memory media, resultant data produced from execution of the requested operation.

The invention claimed is:

1. A memory comprising:
non-volatile memory media including multiple partitions; and
media access circuitry coupled with the non-volatile memory media, the media access circuitry including a plurality of compute logic units and a plurality of scratch pads, each of the plurality of scratch pads corresponding to one of the multiple partitions, wherein each of the multiple partitions corresponds to one of the plurality of compute logic units; each of the plurality of compute logic units to:
access data from a corresponding partition of the non-volatile memory media to perform a requested operation;
store the data in one of the plurality of scratch pads corresponding to the partition;
perform sub-operations of the requested operation on the data concurrently with other compute logic units of the plurality of compute logic units; and
write, to the non-volatile memory media, resultant data from execution of the requested operation.

2. The memory of claim 1, wherein:
the plurality of compute logic units are to concurrently access the data from the multiple partitions.

3. The memory of claim 2, wherein:
each of the plurality of compute logic units corresponds to multiple partitions of the non-volatile memory media.

4. The memory of claim 1, wherein:
the data includes a matrix; and
each of the sub-operations comprises an operation on a portion of the matrix.

5. The memory of claim 1, wherein:
the requested operation comprises one or more of:
AND, OR, XOR, NOR, a tensor operation, and matrix multiplication.

6. The memory of claim 1, wherein:
the non-volatile memory media and the media access circuitry are located on a same die.

7. The memory of claim 1, wherein:
the non-volatile memory media and the media access circuitry are located on separate dies.

8. The memory of claim 1, wherein:
the media access circuitry comprises CMOS circuitry.

9. The memory of claim 1, wherein:
the media access circuitry comprises CMOS circuitry under the non-volatile memory media.

10. The memory of claim 1, wherein:
The media access circuitry comprises one or more of:
reconfigurable circuitry and ASICs (application-specific integrated circuits).

11. The memory of claim 1, wherein:
the non-volatile memory media comprises crosspoint memory.

12. The memory of claim 11, wherein:
the non-volatile memory media comprises partitions stacked as layers to form a three-dimensional cross point architecture.

13. The memory of claim 1, wherein:
the non-volatile memory media comprises one or more of:
a chalcogenide material and a phase change memory.

14. The memory of claim 1, wherein:
the non-volatile memory media comprises far memory in a multi-level memory scheme.

15. The memory of claim 1, wherein:
the media access circuitry includes memory to store the data accessed from the non-volatile memory media.

16. The memory of claim 1, wherein:
the each of the plurality of scratch pads comprise one or more of: registers and static random access memory (SRAM).

17. A media access circuitry comprising:
circuitry to read matrix data from a non-volatile memory media to perform a requested operation, non-volatile memory media including multiple partitions;
a plurality of scratch pads coupled with the circuitry to store the matrix data read from the non-volatile memory media, each of the plurality of scratch pads corresponding to one of the multiple partitions;
a plurality of compute logic units coupled with the non-volatile memory media,
each of the plurality of compute logic units to:
  access, concurrently with other compute logic units of the plurality of compute logic units, data from a corresponding partition of the non-volatile memory media;
  store the data in one of the plurality of scratch pads corresponding to the partition;
  perform sub-operations of the requested operation on the data concurrently with other compute logic units of the plurality of compute logic units; and
  write, to the non-volatile memory media, resultant data from execution of the requested operation.

18. A system comprising:
a non-volatile memory module comprising one or more packages, each of the one or more packages comprising:
  non-volatile memory media including multiple partitions; and
  a plurality of compute logic units coupled with the non-volatile memory media and a plurality of scratch pads, each of the plurality of scratch pads corresponding to one of the multiple partitions, wherein each of the multiple partitions corresponds to one of the plurality of compute logic units; each of the plurality of compute logic units to:
    access, concurrently with other compute logic units of the plurality of compute logic units, data from a corresponding partition of the non-volatile memory media to perform a requested operation;
    store the data in one of the plurality of scratch pads corresponding to the partition;
    perform, concurrently with each of the plurality of compute logic units, the requested operation on the data; and
    write, to the non-volatile memory media, resultant data from execution of the requested operation.

19. The system of claim 18, wherein:
the non-volatile memory module comprises a dual in-line memory module (DIMM).

20. The system of claim 18, further comprising:
one or more of the following coupled with the non-volatile memory module: a memory controller, a processor, and a display.

21. The memory of claim 1, wherein a compute logic unit of the plurality of compute logic units is to:
broadcast data accessed from a partition corresponding to the compute logic unit to one or more other compute logic units of the plurality of compute logic units.

22. The media access circuitry of claim 17, wherein a compute logic unit of the plurality of compute logic units is to:
broadcast data accessed from a partition corresponding to the compute logic unit to one or more other compute logic units of the plurality of compute logic units.

* * * * *